United States Patent
Scheepers et al.

(10) Patent No.: US 8,225,651 B2
(45) Date of Patent: Jul. 24, 2012

(54) SYSTEM AND METHOD FOR TESTING A VEHICLE

(75) Inventors: Bart Theodoor Maria Scheepers, Heythuysen (NL); Antonius Cornelis Maria Versmissen, Vlaardingen (NL); Jeroen Ploeg, Helmond (NL); Rene Mathieu Corbeij, Weert (NL); Pieter Jan Schutyser, Eindhoven (NL)

(73) Assignee: Nederlandse Organisatie Voor Toegepastnatuurwetenschappelijk Onderzoek TNO, Delft (NL)

( * ) Notice: Subject to any disclaimer, the term of this patent is extended or adjusted under 35 U.S.C. 154(b) by 75 days.

(21) Appl. No.: 12/602,301

(22) PCT Filed: May 30, 2008

(86) PCT No.: PCT/NL2008/050334
§ 371 (c)(1),
(2), (4) Date: Feb. 9, 2010

(87) PCT Pub. No.: WO2008/147197
PCT Pub. Date: Dec. 4, 2008

(65) Prior Publication Data
US 2010/0170330 A1    Jul. 8, 2010

(30) Foreign Application Priority Data
May 31, 2007    (EP) .................................... 07109354

(51) Int. Cl.
*G01M 17/007*    (2006.01)
(52) U.S. Cl. .................................. 73/116.01; 73/118.01
(58) Field of Classification Search ............... 73/116.01, 73/116.06–116.08, 118.01
See application file for complete search history.

(56) References Cited

U.S. PATENT DOCUMENTS

| | | | | |
|---|---|---|---|---|
| 4,848,134 A | * | 7/1989 | Elkins | 73/12.04 |
| 5,463,370 A | * | 10/1995 | Ishikawa et al. | 340/439 |
| 5,635,624 A | * | 6/1997 | Cerny | 73/12.01 |
| 6,023,984 A | * | 2/2000 | Mazur et al. | 73/865.3 |
| 6,684,149 B2 | * | 1/2004 | Nakamura et al. | 701/96 |
| 6,765,495 B1 | * | 7/2004 | Dunning et al. | 340/903 |
| 7,013,704 B2 | * | 3/2006 | Kusters et al. | 73/1.79 |
| 2003/0183023 A1 | * | 10/2003 | Kusters et al. | 73/865.9 |
| 2007/0118319 A1 | | 5/2007 | Pillin et al. | |

FOREIGN PATENT DOCUMENTS

| WO | WO 02/01177 A | 1/2002 |
|---|---|---|
| WO | WO 2004/046677 A | 6/2004 |

OTHER PUBLICATIONS

International Search Report for PCT/NL2008/050334 dated Sep. 2, 2008.

* cited by examiner

*Primary Examiner* — Freddie Kirkland, III
(74) *Attorney, Agent, or Firm* — Leydig, Voit & Mayer Ltd.

(57) ABSTRACT

A test system (1) is arranged for testing vehicle systems which comprise at least one sensor (20). The test system comprises a test stand (11) for accommodating a vehicle (2), an object (12) which is movable relative to the test stand, and a control unit (13) for controlling the movement of the object. The test stand (11) is provided with a speed measurement unit (14) for detecting the virtual speed (v) of the vehicle, while the control unit (13) is arranged for controlling the movement of the object in dependence on said virtual speed. The object (12) preferably is a dummy vehicle which may be pulled along a track (16).

15 Claims, 2 Drawing Sheets

SYSTEM AND METHOD FOR TESTING A VEHICLE

FIELD OF THE INVENTION

The present invention relates to vehicle testing. More in particular, the present invention relates to a system for testing vehicles, vehicle safety systems and/or vehicle sensors in (near-)collision situations, in particular in the pre-crash phase of collision scenarios.

BACKGROUND

Present-day vehicles, such as passenger cars, trucks and trains, are often equipped with alerting or assisting systems which alert the driver to dangerous situations or which may operate the breaks, throttle or steering system when a collision is imminent. A commonly used road vehicle assist system is ABS (Anti-lock Braking System), which regulates braking when the wheels of the vehicle are locking. Another example is parking assistance, which produces a warning signal when the distance to another vehicle or object becomes small. All these systems require sensors which gather information regarding, for example, the speed of the vehicle, the rotational speed of the wheels, the outside temperature, and/or the distance to other objects.

It is of course essential that these vehicle alerting and assistance systems and their sensors work accurately and reliably under all circumstances. Extensive testing of the systems in all possible situations is therefore required. Various systems have been devised to allow the testing of vehicle alerting and assistance systems.

U.S. Pat. No. 7,013,704 (Kusters et al./TNO) discloses a system for testing a vehicle or a vehicle component. The system comprises a test stand on which the vehicle or vehicle component can be positioned, a movable platform or undercarriage on which an object can be positioned, and a control computer to control the movements of the undercarriage. The vehicle or vehicle component comprises at least one sensor while the vehicle may be provided with an "intelligent" system. The undercarriages, which may carry actual vehicles, dummy vehicles or other objects, each have four wheels which can all be both driven and steered. This allows the undercarriages and the vehicles they carry to freely move over a test road surface and to perform various manoeuvres. The test stand, which is controlled by a central control computer, allows the vehicle being tested to make various rotational movements and to simulate the effects of road friction, vehicle mass and other factors.

Although the system of U.S. Pat. No. 7,013,704 is very useful to simulate various manoeuvres, it is less suitable for simulating (near-)collision situations. The undercarriages are incapable of decelerating quickly. If an undercarriage approaches the vehicle being tested at a high speed, it has to slow down relatively early, make an evasive movement, or collide with the vehicle. Slowing down early or making an evasive movement makes it impossible to study a vehicle safety system during the crucial last second before impact, while colliding with the vehicle obviously causes both the vehicle being tested and the undercarriage (including the vehicle being carried by the undercarriage) to be damaged, thus significantly increasing the cost of the test.

In addition, in the test system of U.S. Pat. No. 7,013,704 other objects (placed on undercarriages) can manoeuvre relative to the vehicle being tested. Although the test stand allows to measure the effects of vehicle rotations (yaw, pitch, roll) and vehicle mass on the sensor measurements, the system does not take the effects of braking or acceleration of the vehicle on the relative speed and distance to the undercarriages into account. Accordingly, the possibilities of performing realistic (near-)collision tests are necessarily limited.

U.S. Pat. No. 6,023,984 (Mazur et al./Breed Automotive) discloses a test apparatus for testing occupant sensors in a vehicular safety restraint system. The test apparatus comprises a stationary sensor and a "crash sled": a movable sled capable of sliding on a support. The sled can be accelerated and decelerated by a DC motor and/or springs. This known test apparatus simulates the movement of the occupant of a vehicle but is not capable of taking the actual dynamic behaviour of the vehicle into account. Neither is it capable of sensing objects outside the vehicle.

SUMMARY OF THE INVENTION

It is an object of the present invention to overcome these and other problems of the Prior Art and to provide a system for testing vehicles, vehicle safety systems and/or vehicle sensors which allows a more realistic simulation of (near-)collision situations.

Accordingly, the present invention provides a test system for testing vehicle systems comprising at least one sensor, the test system comprising:

a test stand for accommodating a vehicle,
a sensor support for accommodating the at least one sensor,
an object which is movable relative to the at least one sensor,
a control unit for controlling the relative movement of the object, and
a speed measurement unit for detecting the virtual speed of the vehicle, wherein the control unit is arranged for controlling the relative movement of the object in dependence on said virtual speed.

By controlling the (relative) movements of the object in dependence on the virtual speed of the vehicle, a much more realistic simulation is obtained. As the virtual speed of the vehicle on the test stand represents the speed of the vehicle on the road, the movement of the object in the test system is made to correspond to the relative movement of the object on the road. That is, the movement of the object(s) relative to a moving vehicle is realistically simulated, taking both the speed and any speed change of the vehicle into account. By coupling the vehicle speed to the movement of the objects, a much more realistic simulation is obtained and the effects of steering, deceleration (e.g. braking) and/or acceleration of the vehicle are included in the simulation.

The virtual speed is preferably derived from the rotational speed of at least one driven wheel on a test stand. This rotational speed may then be measured by measuring the rotational speed of a test bank roller or by directly measuring the rotational speed of the wheel using optical and/or electromagnetic means.

It is noted that the term vehicle systems is meant to comprise vehicle sensors, vehicle safety systems, vehicle control systems and/or complete vehicles, and that the term vehicle safety systems is meant to comprise driver assisting systems, driver alerting systems and/or similar systems.

Although the movements of the object could depend solely on the virtual speed of the vehicle, it is preferred that its movements also depend on a predetermined course which corresponds with a desired test scenario. That is, the object control unit preferably stores a pre-programmed virtual object course (resulting in positions and speeds relative to the sensor), which course is then altered in dependence on the virtual speed of the vehicle. This allows very realistic tests to be carried out.

In a preferred embodiment, the object is movable on a track, thus providing a well-defined trajectory having a single degree of freedom. This allows the position, speed and acceleration/deceleration of the object to be better controlled. In order to provide an additional degree of freedom, the object can be arranged so as to be pivotable relative to the track, thus providing a yawing movement.

It is noted that the system of the present invention preferably includes only a single object but that in alternative embodiments multiple objects and multiple tracks may be present.

In an embodiment comprising a track on which the object(s) may be moved, the movement of the object(s) relative to the sensor is achieved by moving the object(s) while keeping the sensor stationary. Alternatively, or additionally, the sensor could be moved relative to the (moving or stationary) object(s).

The track is preferably straight but may also be curved. It is preferred that the track consists of a set of rails for guiding wheels of the object, and that the object is propelled by means of a pulling cord which, in turn, may be propelled by a conventional electric motor. In alternative embodiments, however, the object may be propelled by a linear electric motor, pressurised air, or other suitable means. Any means used for the acceleration of the object may also be used for its deceleration.

For (near-)collision tests, the deceleration provided by pulling cords or similar means is typically not sufficient to allow realistic (near-)collision simulations. Using a pulling cord for last-moment deceleration, so as to avoid the object colliding with the sensor, either requires the deceleration to start too soon or results in a collision. For this reason, it is preferred that the system further comprises at least one deceleration member for decelerating the object(s). A deceleration member is preferably resilient and may consist of one or more springs and/or rubber or one or more plastic elements capable of absorbing the kinetic energy of the object or objects. The uses of at least one additional deceleration member makes it possible to delay the moment of deceleration and thus to provide a more realistic (near-)collision test, measuring the behaviour of the vehicle system up to approximately 50 ms before impact.

The test stand may comprise a chassis dynamometer (roller bench), endless belts and/or a similar arrangement so as to allow normal driving conditions to be realistically simulated.

In the system of the present invention, the object is preferably designed to withstand high decelerations. This, in turn, allows realistic (near-)collision tests to be carried out without incurring high costs. In order to withstand high decelerations, the object is preferably simple and may be devoid of sensors and/or electronic parts.

In a first embodiment, the at least one sensor is detached from a vehicle and mounted on a sensor support. By using a sensor which is not mounted in a vehicle, a more flexible test environment may be obtained. In addition, it is easier and less expensive to mount a detached sensor on a pivotally arranged support which allows the sensor to be rotated before and/or during a test.

In a second embodiment, the at least one sensor is located in a vehicle. This vehicle may be the vehicle accommodated on the test stand, but is preferably a second, separate vehicle. Using a sensor mounted in a vehicle offers the advantage that the sensor is tested in a more realistic setting. Using a second vehicle in which the sensor is mounted offers the advantage that the first vehicle and the test stand can need not be positioned close to the object and that the second vehicle may be placed on a pivotally arranged support. By pivoting the vehicle, and hence the sensor, about a vertical axis, a more complicated manoeuvre of the object can be simulated. If the object moves in a straight line, and if the vehicle rotates about a vertical axis, the object will describe a curved trajectory relative to the sensor. Pivoting the vehicle, and hence the sensor, about one or more axes to provide yaw, roll and/or pitch movements may result in more realistic simulations.

In both embodiments, the support may be mounted on a track, in order to provide an additional degree of freedom in the movement of the sensor(s). This additional track, which may be constituted by a set of rails or other guiding element(s), is preferably located at an angle, for example a right angle, to any track on which the object(s) is moved.

The present invention also provides a method of testing vehicle systems comprising at least one sensor, the method comprising the steps of:
  accommodating a vehicle on a test stand,
  controlling the movement of an object relative to the at least one sensor, and
  detecting the virtual speed of the vehicle,
wherein the controlling step comprises controlling the movement of the object in dependence on said virtual speed.

The present invention additionally provides a computer program product for carrying out the controlling step of the method defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

BRIEF DESCRIPTION OF THE DRAWINGS

The present invention will further be explained below with reference to exemplary embodiments illustrated in the accompanying drawings, in which.

DETAILED DESCRIPTION OF THE DRAWINGS

Figure 1:
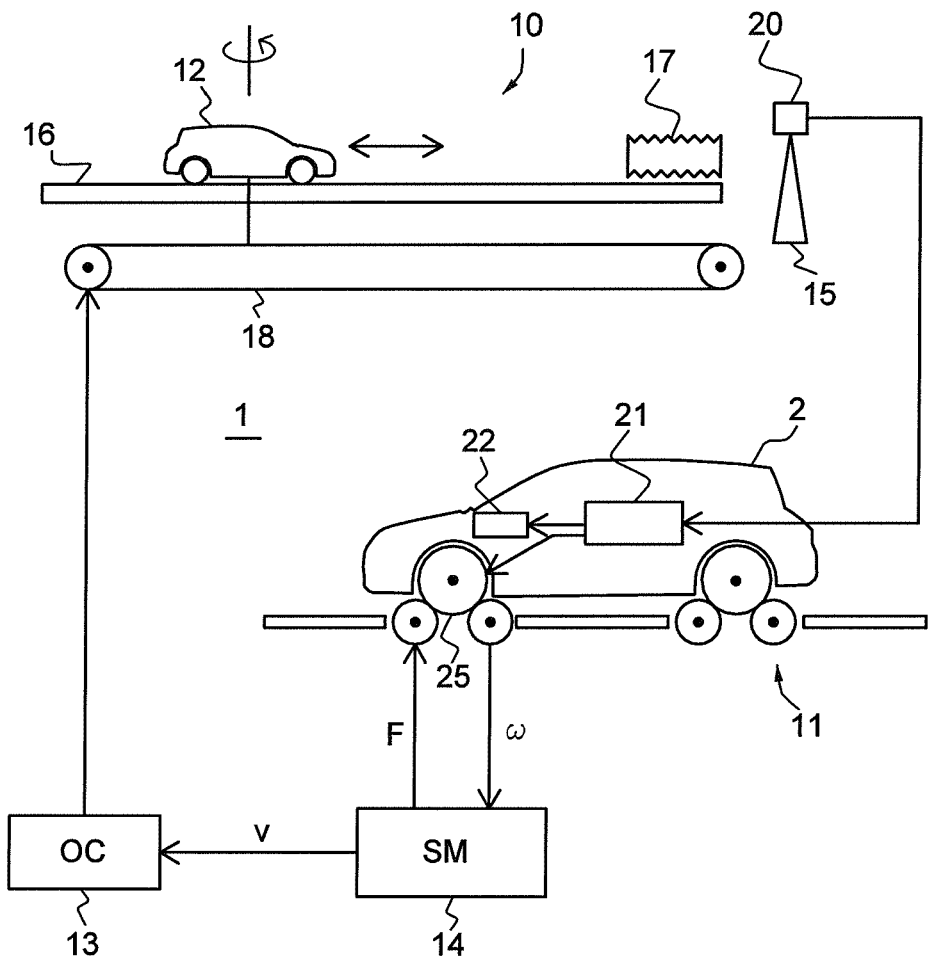
FIG. 1 schematically shows a first embodiment of a vehicle sensor test system according to the present invention.

The test system 1 shown merely by way of non-limiting example in FIG. 1 comprises a test stand 11, an object (also referred to as target object) 12, an object control (OC) unit 13, a speed measurement (SM) unit 14, a sensor support 15 and a track 16. A sensor 20 is mounted on the support 15 at the end of the track 16. The object 12, which in the example shown is a dummy vehicle, is capable of moving over the track 16. The object 12 is propelled by a pulling cable 18 which, in turn, is driven by an electric motor (not shown). Spring elements 17 are positioned at the end of the track 16 to decelerate the object 12. The track 16, the spring elements 17 and the pulling cable 18 together constitute an obstacle section 10. It will be understood that both the obstacle section 10 and the test stand section 11 are illustrated merely schematically and that many parts, including the motor(s) driving the pulling cable 18, have been omitted from FIG. 1 for the sake of clarity of the illustration.

In the example shown, the test stand 11 is constituted by a so-called chassis dynamometer (roller stand) which supports a vehicle (also referred to as test vehicle) 2. The chassis dynamometer may be of a conventional type, having two adjacent rollers for supporting the front wheels and two further adjacent rollers for supporting the rear wheels. At least one roller is coupled to the speed measurement unit 14 which measures the speed ω of the roller and hence of the driven wheels 25 of the vehicle 2, translates this (rotational) speed ω into the virtual (translational) speed v of the vehicle and passes this virtual speed v on to the object control unit 13. In the example shown, the speed measurement unit 14 also acts as a test stand control unit and is capable of applying a suitable braking force F to the rollers to simulate road friction and air drag. In other embodiments, the object control unit 13 and the speed measurement unit 14 can together constitute a single, integrated measurement and control unit.

In the example of FIG. 1, the vehicle 2 is provided with an "intelligent" vehicle (assist/safety) system 21, such as an Advanced Driver Assistance System (ADAS). The vehicle assist system 21 is capable of applying the brakes of the vehicle 2 if an object 12 is on a collision course with the vehicle. The vehicle assist system 21 may also be able to influence the torque of the vehicle engine 22; to this end the vehicle assist system 21 is coupled to the engine 22. In some embodiments, the vehicle assist system 21 may also be capable to influence the steering of the vehicle 2.

The vehicle assist system 21 is coupled to the sensor 20 from which it receives information relating to the environment of the sensor, such as the speed and/or distance of the objects (that is, movable obstacles). The sensor (or sensor unit) 20 may comprise an infra-red sensor, an acoustic sensor, a radar sensor unit, a lidar (light detection and ranging) sensor unit, and/or any other suitable sensing device. In the embodiment of FIG. 1 the sensor 20 is detached from the vehicle 2 and placed on the sensor support 15, so as to allow a convenient arrangement of the moving obstacle section 10 relative to the test stand section 11. However, embodiments can be envisaged in which the test stand 11, together with the vehicle 2, is placed at the position of the support 15, as will be discussed later in more detail.

The vehicle assist system 21 is arranged for responding to information provided by the sensor 20 and any other sensors coupled to the system 21. In response to a decreasing distance between the sensor 20 and the object 12, the vehicle assist system 21 may apply the brakes of the vehicle 2, decrease the engine torque, and/or produce a warning signal. In certain situations some embodiments of the vehicle assist system 21 may increase the engine torque and/or adjust the steering of the vehicle. These virtual speed changes are detected by the speed measurement unit 14 through the test stand 11.

In accordance with the present invention, the (rotational) speed ω of the driven wheels of the vehicle is measured by the speed measurement unit 14 and fed to the object control unit 13 as a virtual vehicle speed v. This allows the object control unit 13 to adjust the movement of the object 12, in particular but not exclusively its speed, in dependence on the virtual speed v of the vehicle 2 (those skilled in the art will understand that the virtual speed v is the speed the vehicle 2 would have when driving on a road when its wheels have a rotational speed equal to ω) and the test scenario.

For example, when the distance detected by the sensor 20 represents the distance to an object "straight ahead" (the sensor would normally be mounted in the front of the vehicle) which is moving towards the vehicle, any braking of the vehicle 2 (initiated by the vehicle assist system 21 and detected by the speed measurement unit 14) would result in a corresponding deceleration of the object 12. It can thus be seen that the speed measurement unit 14, the object control unit 13, the obstacle section 10, the sensor 20, the vehicle system 21 and the test stand 11 together constitute a closed control loop.

The object control unit 13 may be programmed to simulate a certain situation, such as the vehicle approaching a stationary object. In such a scenario, the object 12 would approach the sensor 20 at a speed equal to the virtual speed v of the vehicle. This initial speed of the object would be determined by the object control unit 13. Any changed in the speed of the object would be the result of detected changes in the virtual speed v of the vehicle 2 (as derived from the rotational speed ω of its wheels). The position of the object 12 on the track 16 would be determined by the object's initial position and speed, as controlled by the object control unit 13.

To study near-collision or even collision situations, the object control unit 13 can be programmed to control the (relative) speed and/or displacement of the object 12 in such a way that a "collision" can only just or cannot be avoided (collision or near-collision scenario). When the object 12 approaches the end of the track 16, it is brought to a halt by the spring elements (deceleration members) 17 to stop it from crashing into the sensor 20.

According to a further aspect of the present invention, the movable objects (or obstacles) 12 have a simple, crash-proof construction. The object 12 preferably contains no sensors. In addition, it is preferably externally driven, thus avoiding the need for motors and control devices. The object 12 of the present invention is preferably capable of withstanding a deceleration of at least 10 g, preferably at least 20 g, more preferably at least 35 g (where g is the acceleration caused by gravity and is equal to 9.8 m/s$^2$).

By using a track 16, the movement of the object 12 is well-defined, having only a single degree of freedom. This allows the movements of the object 12 to be carefully controlled. However, in some test scenarios this single degree of freedom is not sufficient. For this reason, it is preferred that the object 12 may pivot about its vertical axis, as illustrated in FIG. 1. This pivot axis allows the object 12 to yaw, which makes more realistic test scenarios possible.

Further scenarios are provided by using a sensor support 15 which can also pivot. That is, in a preferred embodiment the support 15 is designed such that the sensor 20 can rotate about at least one axis, for example its vertical axis, although rotation about two or more axes is also possible. This rotation is preferably effected by actuators located outside the sensor unit, for example actuators located in the sensor support 15, and may be controlled by the object control unit 13 in accordance with a certain test scenario. In addition to a rotation, the support 15 may also be capable of translating the sensor 20, as will later be explained in more detail with reference to FIG. 2.

It is noted that the control signals for the sensor support are preferably produced in accordance with software programs executed by a processor of the object control unit 13 for the various test scenarios.

In the exemplary embodiment of FIG. 1 only the sensor 20 is placed on a sensor support 15, the sensor 20 being separate from the vehicle 2 in which the vehicle system 21 is mounted (in some embodiments the vehicle 2 and the associated sensor 20 may be several kilometres apart). It is, however, possible to use a sensor 20 which is mounted in a vehicle, in which case a vehicle, including the sensor 20, is placed on a suitable sensor support.

Figure 2:
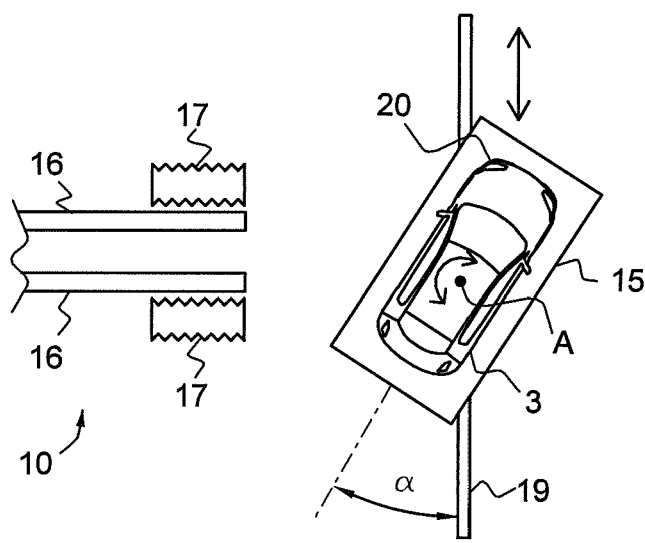
FIG. 2 schematically shows, in top view, part of a second embodiment of a vehicle sensor test system according to the present invention.

In the embodiment illustrated in FIG. 2 the sensor support 15 supports a vehicle 3 which includes at least one sensor 20. The support 15 is made pivotable about a vertical axis A and may be pivoted by, for example, an electric motor (not shown) controlled by the object control unit 13.

It is noted that the vehicle 3 shown in FIG. 2 preferably is an additional vehicle, the vehicle 2 being located on the test stand 11. However, it is also possible for the vehicles 2 and 3 to be one and the same, in which case the support 15 is replaced by the test stand 11, which may also be pivotable about the axis A. Using two separate vehicles 2 and 3 (which are preferably but not necessarily identical) provides the advantage that the test stand can be placed at any convenient location, possibly even at a large distance from the obstacle section 10, and that a pivotable test stand is not required.

In the embodiment shown in FIG. 2, the pivotable support 15 is mounted on a rail 19. A further motor (not shown) may move the support 15 along the rail 19, thus providing an additional degree of freedom. The pivot angle $\alpha$ shown in FIG. 2 is measured relative to the longitudinal direction of rail 19. By providing both a pivot angle and a movement along the rail 19, which translational movement is in the embodiment shown substantially perpendicular to the longitudinal direction of the track 16, almost any manoeuvre of the object 12 relative to the vehicle sensor 20 may be simulated. Both the pivot angle $\alpha$ and the translational movement along the rail 19 are, in the embodiment shown, controlled by the object control unit 13, preferably in real time.

It is noted that the obstacle sections 10 illustrated in FIGS. 1 and 2 may also be utilized independently, without receiving speed information from a test stand (open control loop). In certain embodiments, the test stand (11 in FIG. 1) may even be absent.

Figure 3:
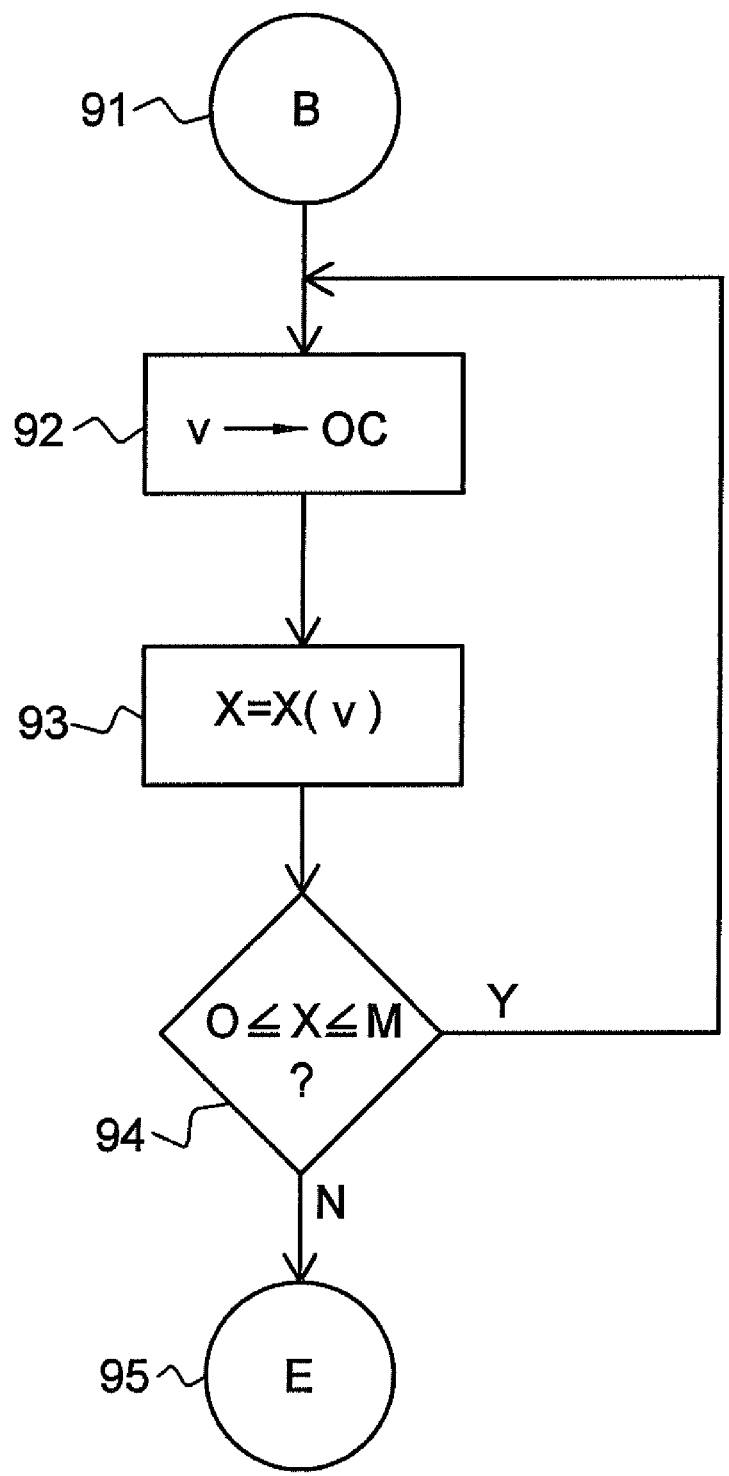
FIG. 3 schematically shows a flow diagram illustrating the object movement control steps in accordance with the present invention.

FIG. 3 schematically shows an exemplary embodiment of a control program in accordance with the present invention. The program begins (B) at step 91 and continues with step 92, in which the current value of the virtual speed v of the vehicle is retrieved by the object control (OC) unit (13 in FIG. 1).

In step 93, a control parameter X is determined as a function of the current value of the virtual speed v and the programmed (virtual) trajectory of the object. That is, the control parameter X will depend on both the virtual speed v measured by the test stand and the test scenario being used. In the embodiment of FIG. 1 the control parameter X(v) will typically be constituted by the displacement of the object relative to the track (16 in FIG. 1) and/or the speed of the object relative to the track. In other embodiments in which the objects have more degrees of freedom, the control parameter could include additional factors, such as direction (pivot angle). The speed of the object is a relative speed, given by the difference between the virtual speed v of the vehicle (as derived from the measured speed $\omega$) and the virtual speed of the object (as determined by a test scenario).

In step 94 it is determined whether the parameter X is greater than zero and smaller than a suitable non-zero threshold value M (where M may be the length of the track 16). If this is the case (Yes), which means that the object is still on the operational section of the track, the control loop branches back to step 92. If this is not (N) the case, the test is finished and the program ends (E) at step 95. It is noted that the test of step 94 need not be carried out by the object control unit 13 but could be carried out mechanically by suitable (automatic) mechanisms attached to the track 16. The object 12 could, for example, be mechanically disengaged from the pulling cable when reaching the spring elements 17.

The control program is executed by the object control unit 13. To this end, the object control unit 13 is preferably provided with a processor and an associated memory, the memory being arranged for storing the program and any variables. The object control unit 13 may be constituted by a general purpose computer, such as a personal computer, running suitable software programs.

The system of the present invention allows both near-collision vehicle test scenarios and collision vehicle test scenarios to be carried out in a realistic, reproducible, safe and cost-efficient manner. Using the virtual speed of the vehicle, as indicated by the rotational speed $\omega$ of the wheels, to control the speed of the objects 12 allows a very realistic simulation of the effects of braking, accelerating and manoeuvring. Providing sturdy, crash-resistant objects makes it possible to use very high decelerations and therefore to simulate various traffic situations just before impact. Using a pivotable and/or slidable sensor support provides additional degrees of freedom for the trajectories which can be simulated.

The present invention is based upon the insight that the (relative) movement of obstacles in a (near-)collision scenario should be made similar to the (relative) moment in actual situation. This is achieved by making the (relative) position and movement of obstacles dependent on the virtual speed of the vehicle to be tested, so as to produce a realistic relative speed of the obstacles. The present invention benefits from the further insight that obstacles moving along a predetermined trajectory, preferably defined by a track, are more easily brought to a stop without causing damage. The present invention also benefits from the still further insight that simple and robust moving obstacles can be used at high decelerations so as to closely approach the sensor at a high speed.

Although the present invention has been explained with reference to (near-)collision vehicle tests, the invention is not so limited and may also be applied in other test settings, for example in manoeuvring tests for vehicles.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A test system for testing vehicle systems comprising at least one sensor, the test system comprising:
    a test stand for accommodating a vehicle,
    a sensor support for accommodating the at least one sensor,
    an object which is movable relative to the at least one sensor,
    a track, the object being movable relative to the at least one sensor along the track
    at least one deceleration member at an end of the track capable of absorbing kinetic energy of the object,
    a speed measurement unit for detecting a virtual speed of the vehicle; and
    a control unit for controlling a relative movement of the object towards the at least one sensor along the track in dependence on said virtual speed detected by the speed measurement unit.

2. The system according to claim 1, wherein the control unit is arranged for controlling the relative movement of the object also in dependence on a test scenario.

3. The system according to claim 1, wherein the object is pivotally arranged.

4. The system according to claim 1, wherein the test stand comprises a roller bench and/or endless belts.

5. The system according to claim 1, wherein the object is designed to withstand decelerations exceeding 20 g.

6. The system according to claim 1, wherein the at least one sensor is detached from the vehicle.

7. The system according to claim 6, wherein the sensor support is pivotally arranged, and wherein any pivotal movement of the sensor is controlled by the control unit.

8. The system according to claim 1, wherein the at least one sensor is located in the vehicle.

9. A control unit for use in the test system according to claim 1.

10. The system according to claim 1, wherein the speed measurement unit is configured to derive the virtual speed is preferably derived from a rotational speed of at least one driven wheel of the vehicle.

11. The system according to claim 10, wherein the test stand comprises a roller bench with a test bank roller and wherein the speed measurement unit is configured to measure the rotational speed by measuring the rotational speed of the test bank roller.

12. The system according to claim 10, wherein the speed measurement unit is configured to measure the rotational speed of the driven wheel directly using optical and/or electromagnetic detectors.

13. A method of testing vehicle systems comprising at least one sensor, the method comprising the steps of:
    accommodating a vehicle on a test stand,
    detecting a virtual speed of the vehicle,
    controlling a movement of an object, on a track, relative to the at least one sensor, wherein at least one deceleration member is positioned at an end of the track, the deceleration member being positioned to absorb kinetic energy from the object, and
    the relative movement of the object along the track being controlled in dependence on said virtual speed until the object is brought to a halt by the at least one deceleration member.

14. The method according to claim 13, wherein the controlling step comprises controlling the relative movement of the object also in dependence on a test scenario.

15. The method according to claim 13, wherein the object is movable on a track.

* * * * *

UNITED STATES PATENT AND TRADEMARK OFFICE
CERTIFICATE OF CORRECTION

| | | |
|---|---|---|
| PATENT NO. | : 8,225,651 B2 | Page 1 of 1 |
| APPLICATION NO. | : 12/602301 | |
| DATED | : July 24, 2012 | |
| INVENTOR(S) | : Bart Theodoor Maria Scheepers et al. | |

It is certified that error appears in the above-identified patent and that said Letters Patent is hereby corrected as shown below:

Title page

Item (73) Assignee: "Nederlandse Organisatie Voor Toegepastnatuurwetenschappelijk Onderzoek TNO" should be --Nederlandse Organisatie Voor Toegepast-natuurwetenschappelijk Onderzoek TNO.--

Signed and Sealed this

Eighteenth Day of September, 2012

David J. Kappos
*Director of the United States Patent and Trademark Office*